United States Patent [19]

Etoh et al.

[11] Patent Number: 4,914,596
[45] Date of Patent: Apr. 3, 1990

[54] SYSTEM AND METHOD FOR AUTOMATICALLY CONTROLLING VEHICLE SPEED TO DESIRED CRUISE SPEED

[75] Inventors: Yoshiyuki Etoh; Hiroshi Inoue; Kazuyuki Mori; Koichi Suzuki; Kinichiro Nakano; Hiroyuki Nomura; Isao Yamamoto; Kiyoshi Yoshida; Yasuhisa Takeuchi; Hiroshi Tanaka, all of Kanagawa, Japan

[73] Assignee: Nissan Motor Company, Limited, Yokohama, Japan

[21] Appl. No.: 264,731

[22] Filed: Oct. 31, 1988

[30] Foreign Application Priority Data

Oct. 29, 1987 [JP] Japan ............... 62-164514[U]
Oct. 29, 1987 [JP] Japan ............... 62-164515[U]
Oct. 29, 1987 [JP] Japan ............... 62-164517[U]

[51] Int. Cl.⁴ .................................................. B60K 31/00
[52] U.S. Cl. ........................... 364/426.04; 180/179; 123/352
[58] Field of Search ............ 364/426.04, 431.07; 180/176–179; 123/352

[56] References Cited

U.S. PATENT DOCUMENTS 4,120,373 10/1978 Fleischer ........................ 180/179
4,254,844 3/1981 Collonia ......................... 180/179
4,394,739 7/1983 Suzuki et al. ................... 180/179
4,539,642 9/1985 Mizuno et al. ................. 364/426.04

Primary Examiner—Gary Chin
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruise speed are disclosed in which whether after any one of command and release signals is outputted from the corresponding set/cruise, acceleration, resume, brake, clutch, and cancel switches, a control unit outputs a corresponding receipt signal via a corresponding output port is determined, whether the contents of the control command signals presently outputting through the respective control valves are equal to inverted levels at the respective control valve is determined, and a power supply to control valves for adjusting an operating variable of an engine driving force adjusting mechanism and the control unit is interrupted when at least one of the results of determinations indicates a negative result. In addition, when the control unit outputs the control command signals to the control valves to increase the vehicle speed, a subroutine of monitoring a cruise speed control enable state from the vehicle speed, command switches, release switches, and flag indicating the cruise control state in the control unit is executed.

17 Claims, 8 Drawing Sheets

SYSTEM AND METHOD FOR AUTOMATICALLY CONTROLLING VEHICLE SPEED TO DESIRED CRUISE SPEED

BACKGROUND OF THE INVENTION

1. Field of the invention

The present invention relates to an improved system and method for automatically controlling a vehicle speed to a desired cruise speed having a fail safe function.

2. Background of the Art

Various types of systems and methods for automatically controlling a vehicle speed to desired cruise speed without operation of an accelerator pedal have been proposed.

One of the automatic cruise speed controlling systems is exemplified by a Japanese Patent Application First Publication No. sho 60-42131 published on Mar. 6, 1985.

In a vehicle in which the automatic cruise speed controlling system disclosed in the above-identified Japanese Patent Application Publication is mounted, the speed of the vehicle at which a driver desires to cruise is set through a set/cruise switch. The opening angle of a throttle valve is adjusted so that the vehicle speed coincides with the set cruise speed. With the system, it is convenient for the driver to run the vehicle at the set cruise speed without operation of the accelerator pedal.

In such an automatic cruise speed controlling system, a control unit having a microcomputer is provided in which a throttle actuator is controlled in accordance with the contents of a command signal. The command signal is derived from any one of several command switches including the set/cruise switch, and release switches which release cruise speed control.

However, as recent trends dictate, countermeasures against software and hardware troubles due to high level noises are demanded.

SUMMARY OF THE INVENTION

It is an object of the present invention to provide an improved system for automatically controlling which can achieve an optimum and more reliable cruise speed control with countermeasures against software and hardware troubles.

The above-described object can be achieved by providing a system for a vehicle, comprising: (a) first means for detecting a current vehicle speed; (b) second means having a plurality of command switches for operatively outputting command signals on a cruise speed run of the vehicle, respectively; (c) third means having a plurality of relase switches, through each of the release switches a corresponding release signal being outputted; (d) fourth means, responsive to any one of the command signals from the second means, for outputting a control command signal through each of a plurality of first output ports according to the corresponding contents of the one of the command signals and responsive to any one of the release signals, for outputting a release command signal, the fourth means outputting a plurality of receipt signals whose number corresponds to that of the command and release signals, each receipt signal indicating that the corresponding command and release signal is received by the fourth means from the second and third means and being outputted via a plurality of second output ports; (e) fifth means having a plurality of control valves for, with a power supply being received thereat, adjusting an operating variable of an engine driving force adjusting mechanism according to the contents of the control command signals outputted from the fourth means via the respective first output ports so that the current vehicle speed is controlled in accordance with the corresponding one of the contents of the command signals derived from the second means; (f) sixth means for determining whether after any one of the command and release signals is outputted from the second and third means, the fourth means outputs the corresponding receipt signal via the corresponding second output port; (g) seventh means for determining whether the contents of the control command signals presently outputting through the respctive first output ports from the fourth means are equal to inverted levels at the respective control valves of the fifth means; and (h) eighth means for interrupting the power supply to the fourth means and fifth means when at least one of the results of determinations by the sixth and seventh means satisfies a predetermined condition of determining the interruption of power supply to the fourth and fifth means.

The above-described object can also be achieved by providing a system for a vehicle, comprising: (a) first means for detecting a current vehicle speed; (b) second means having a plurality of command switches for operatively outputting command signals on a cruise speed run of the vehicle, respectively; (c) third means having a plurality of release switches through each of the release switches a corresponding release signal being outputted; (d) fourth means, responsive to any one of the command signals from the second means, for outputting a control command signal through each of a plurality of first output ports according to the corresponding contents of the one of the command signals and, responsive to any one of the release signals, for outputting a release command signal, the fourth means outputting a plurality of receipt signals whose number corresponds to that of the command and release signals, each receipt signal indicating that the corresponding command and release signal is received by the fourth means from the second and third means and being outputted via a plurality of second output ports; (e) fifth means having a plurality of control valves for, with a power supply being received thereat, adjusting an operating variable of an engine driving force adjusting mechanism according to the contents of the control command signals outputted from the fourth means via the respective first output ports so that the current vehicle speed is controlled in accordance with the corresponding one of the contents of the command signals derived from the second means; (f) sixth means for detecting at least one of conditions that after any one of the command and release signals is outputted from the second and third means, the fourth means outputs no corresponding receipt signal via the corresponding second output port and that at least one of the contents of the control command signals presently outputting through the respective first output ports from the fourth means is unequal to a corresponding inverted level at the corresponding control valve of the fifth means; and (g) seventh means for interrupting the power supply to the fourth and fifth means when at least one of the conditions is detected by the sixth means.

The above-described object can also be achieved by providing a system for a vehicle, comprising: (a) first means for detecting a current vehicle speed; (b) second means having a plurality of command switches for operatively outputting command signals on a cruise speed run of the vehicle, respectively; (c) third means having a plurality of release switches through each of the release switches a corresponding release signal being outputted; (d) fourth means, responsive to any one of the command signals from the second means, for outputting a control command signal through each of a plurality of first output ports according to the corresponding contents of the one of the command signals and, responsive to any one of the release signals, for outputting a release command signal, the fourth means outputting a plurality of receipt signals whose number corresponds to that of the command and release signals, each receipt signal indicating that the corresponding command and release signal is received by the fourth means from the second and third means and being outputted via a plurality of second output ports; (e) fifth means having a plurality of control valves for, with a power supply being received thereat, adjusting an operating variable of an engine driving force adjusting mechanism according to the contents of the control command signals outputted from the fourth means via the respective first output ports so that the current vehicle speed is controlled in accordance with the corresponding one of the contents of the command signals derived from the second means; (f) sixth means for determining whether after any one of the command and release signals is outputted from the second and third means, the fourth means outputs the corresponding receipt signal via the corresponding second output port; (g) seventh means for determining whether the contents of the control command signals presently outputting through the respective first output ports from the fourth means are equal to inverted levels at the respective control valves of the fifth means; and (h) eighth means for continuing the power supply to the fourth means and fifth means when at least one of the results of determinations by the sixth and seventh means satisfies a predetermined condition of determining the continuation of power supply to the fourth and fifth means.

The above-described object can be achieved by providing a method for automatically controlling a vehicle speed to a desired cruise speed, comprising the steps of: (a) detecting a current vehicle speed; (b) providing a plurality of command switches for operatively outputting command signals on a cruise speed run of the vehicle, respectively; (c) providing a plurality of release switches through each of the release switches a corresponding release signal being outputted; (d) providing controlling means, responsive to any one of the command signals from the command switches, for outputting a control command signal through each of a plurality of first output ports according to the corresponding contents of the one of the command signals and, responsive to any one of the release signals, for outputting a release command signal, the fourth means outputting a plurality of receipt signals whose number corresponds to that of the command and release signals, each receipt signal indicating that the corresponding command and release signal is received from the command and release switches and being outputted via a plurality of second output ports; (e) providing a plurality of control valves for, with a power supply being received thereat, adjusting an operating variable of an engine driving force adjusting mechanism according to the contents of the control command signals outputted from the controlling means via the respective first output ports so that the current vehicle speed is controlled in accordance with the corresponding one of the contents of the command signals derived from the command switches; (f) determining whether after any one of the command and release signals is outputted from the command and release switches, the controlling means outputs the corresponding receipt signal via the corresponding second output port; (g) determining whether the contents of the control command signals presently outputting through the respective first output ports from the controlling means are equal to inverted levels at the respective control valves; and (h) interrupting the power supply to the controlling means and control valves when at least one of the results of determinations in the steps (f) and (g) satisfies a predetermined condition of determining the interruption of power supply to the controlling means and control valves.

DETAILED DESCRIPTION OF THE PREFERRED EMBODIMENTS

Reference will hereinafter be made to the drawings in order to facilitate understanding of the present invention.

First preferred embodiment

Figure 1:
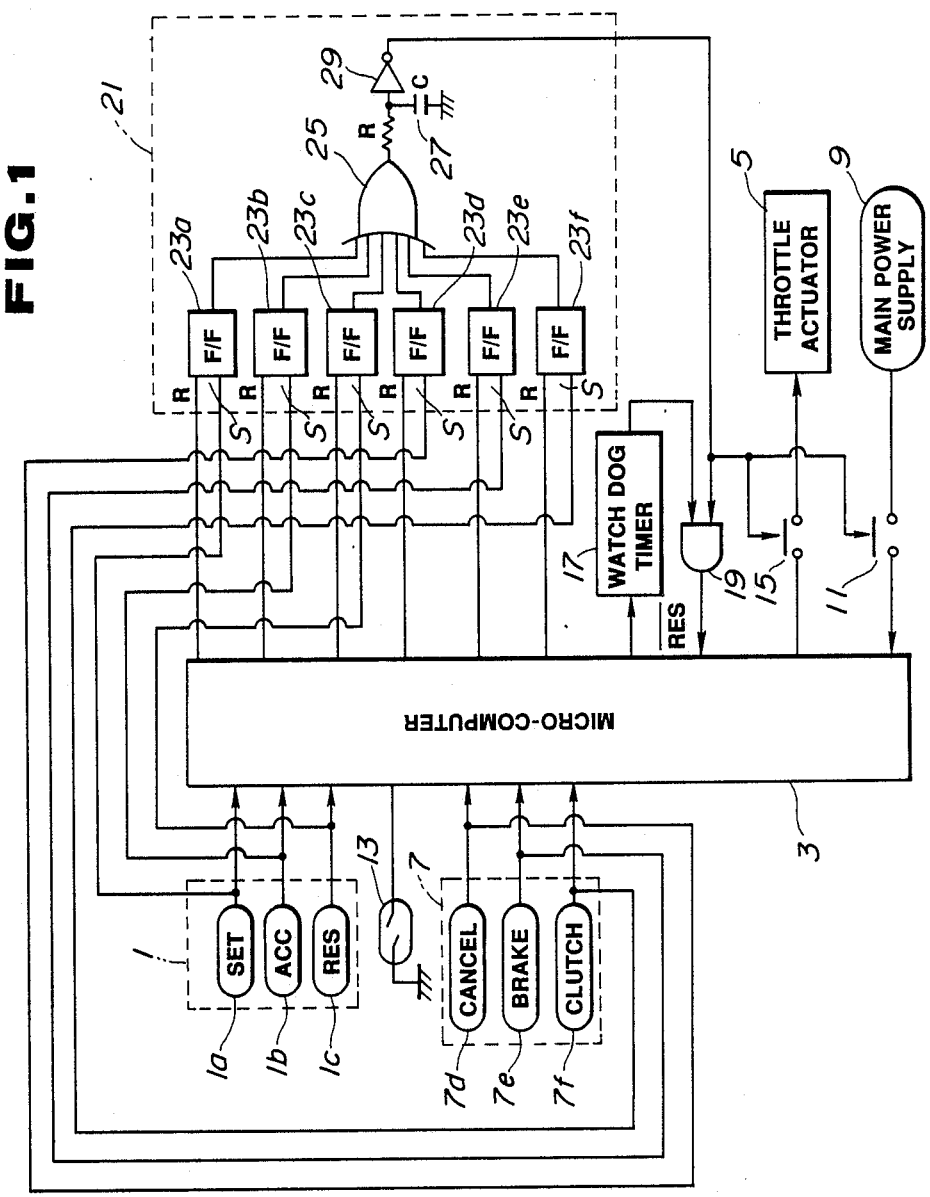
FIG. 1 is a schematic block diagram of a system for automatically controlling a vehicle speed to a desired cruise speed according to the present invention in a first preferred embodiment.

FIG. 1 shows a first preferred embodiment of a system for automatically controlling a vehicle speed to a desired cruise speed according to the present invention.

As shown in FIG. 1, a command switch group 1 includes a set/cruise switch 1a, acceleration switch 1b, and resume switch 1c through which any one of the command signals to command a cruise speed control to be described later is issued from a microcomputer 3.

The set/cruise switch 1a is used to set a cruise speed at which the driver desires to cruise. When the driver operates the set/cruise switch 1a in a cruise speed control allowable range from, e.g., 50 Km/h to, e.g., 100 Km/h allowable range), the vehicle speed at the time of operation of the switch 1a is set as the cruise speed and the vehicle run at the set cruise speed is initiated. During the cruise run control, the vehicle speed is sequentially reduced due to an engine braking according to a duration of operation (i.e., according to a duration for which the switch 1a is continued to be left on).

The acceleration switch 1b is used to increase the vehicle speed at a constant acceleration when the switch 1b is left on. When the vehicle cruises at the vehicle speed above the lower limit of the cruise speed allowable range and the acceleration switch 1b is operated, the vehicle speed is increased. When the vehicle speed then arrives at another desired vehicle speed, the acceleration switch 1b is operated (turned off) so that the cruise speed control remains at that vehicle speed.

The resume switch 1c is used to return the vehicle speed to the originally set cruise speed before reduction of the vehicle speed due to the release of the vehicle speed control. When the vehicle speed is reduced due to a brake operation and the resume switch 1c is turned on, the vehicle speed is returned and the cruise speed control is resumed.

In addition, the microcomputer 3 is externally provided with a release switch group denoted by 7 for releasing the cruise speed control. The release switch group 7 includes a cancel switch 7d, brake switch 7e, and clutch switch 7f. The cancel switch 7d is used to cancel (release) the cruise speed control through the driver. The brake switch 7e and clutch switch 7f are operated (open) when the driver depresses a brake pedal or clutch pedal so so to issue a release signal to the microcomputer 3 to release the present cruise speed control.

A power supply to the microcomputer 3 is carried out from a main power supply (vehicle battery) 9 via a main relay 11.

The microcomputer 3 receives any one of the command signals from the command switch group 1 and vehicle speed information derived from a vehicle speed sensor 13 and issues control command signals to a throttle actuator 5 via a throttle actuator relay 15 in accordance with the corresponding contents of one of the command signals described above and vehicle speed information from the sensor 13. The control command signals are used to control the throttle actuator 5 so that the vehicle speed is controlled to cruise the vehicle at the set cruise speed.

Furthermore, a watchdog timer 17 is connected to the microcomputer to detect an operation state of the microcomputer 3. If the microcomputer 3 does nor operate normally, the watchdog timer 17 outputs a reset signal. The watchdog timer 17 is exemplified by a United States Patent Application titled as SYSTEM AND METHOD FOR AUTOMATICALLY CONTROLLING A VEHICLE SPEED TO A DESIRED CRUISE SPEED USING MICROCOMPUTER having a priority of a Japanese Patent Application No. sho 62-273935 filed on Oct. 29, 1987, the disclosure of which is hereby incorporated by reference. When the watchdog timer 17 detects that the microcomputer is not operating normally, the watchdog timer 17 outputs a low-level signal (reset signal) to an AND gate 19. If the AND gate 19 passes the reset signal, the microcomputer 3 is reset. The reset means that the microcomputer 3 is turned to the initial condition.

Furthermore, the microcomputer 3 is provided externally with a monitor circuit 21 for monitoring whether any one of command signals from the command switch group 1 or any one of the release signals derived from the release switch group 7 is received by the microcomputer 3.

The monitor circuit 21 includes flip-flop (F/F) circuits 23a, 23b, 23c, 23d, 23e, 23f, OR gate 25, noise elimination circuit 27, and inverter 29.

It is noted that each flip-flop circuit 23a to 23f is provided for each corresponding command switch 1a to 1c and each corresponding release switch 7d to 7f. Each set (S) terminal of the F/Fs 23a to 23f receives the corresponding command signal derived from theses switches 1a to 1c and release signal derived from each release switch 7d to 7f. Each reset (R) terminal of the F/Fs 23a to 23f receives a corresponding receipt signal indicating that the command signal derived from the corresponding command switch 1a to 1c and from the corresponding release switch 7d to 7f is received by the microcomputer 3.

That is to say, the F/F circuits 23a to 23f are set in response to the corresponding command signals and their output terminals thereof are at the high level states. In addition, the F/F circuits 23a to 23f are reset in response to the corresponding receipt signals and their output terminals are at the low-level states.

Hence, a recognition that any one of the command and release signals is transmitted to the microcomputer 3 and received by the microcomputer 3 is carried out. When the receipt signals are in turn, supplied to the F/F circuit 23a to 23f, the output signal of the F/F circuits 23a to 23f are, then, turned to the low levels. However, when no receipt signal is outputted from the microcomputer 3 although one command or release signal is inputted thereto, the corresponding one of the F/F circuits 23a to 23f remains in the set state and its output signal is held in the high-level state.

The OR gate 25 has input terminals connected to the output terminals of the F/F circuits 23a to 23f and the output end of the OR gate 25 is connected to an input terminal of the inverter 29 via the noise elimination circuit 27 including a resistor R and capacitor C. The output signal of the inverter 29 is supplied to the input end of the AND gate 19 and to the main relay 11 and throttle actuator relay 15. It is noted that the one input end of the AND gate receives the output signal from the watchdog timer 17.

When at least one of the input signals of the OR gate 25 becomes high level and the output signal of the inverter 29 becomes low level, the microcomputer 3 is reset and the main relay 11 and throttle actuator relay 15 are released (open). Therefore, the power supply from the main power supply 9 to the microcomputer 3 and the supply of the control command signals from the microcomputer 3 to the throttle actuator 5 are simultaneously inhibited.

Next, an operation of the automatic cruise speed controlling system shown in FIG. 1 will be described with reference to FIGS. 2(A) and 2(B).

In a step 100, the microcomputer 3 measures the current vehicle speed v from the vehicle speed information from the vehicle speed sensor 13.

In a step 110, the microcomputer 3 determines whether the current vehicle speed v falls in the cruise speed allowable range from $v_L$ to $v_H$.

If $v > v_H$ of $v \leq v_L$ (No) in the step 110, the microcomputer 3 sets a cruise flag CF to zero "0", the cruise flag indicating whether the vehicle is in the cruise speed state, the set cruise speed is reset to zero, and all control valves in the throttle actuator 5 are deenergized (the contents of all control command signals are in the low-level states) not to execute the cruise speed control in steps 180 and 190.

If $v_L \leq v \leq v_H$ in the step 110, the routine goes to a step 120 if the microcomputer 3 operates normally.

If the cancel switch 7d is operated in that state, one release signal is supplied from the cancel switch 7d to the microcomputer 3 and to the reset terminal of the F/F circuit 23d. When the release signal is received by the microcomputer 3, the receipt signal is supplied from the microcomputer 3 to the reset terminal of the F/F circuit 23d and the F/F circuit 23d is reset. Furthermore, the processings in the steps 180 and 190 are carried out and the routine is ended in steps 120, 130, 180, and 190.

If the answer is No (negative) in the step 120, the routine goes to a step 140 in which the microcomputer 3 determines whether the brake switch 7e is turned on or off. If the brake switch is turned on (closed) in the step 140, the routine goes to a step 160 in which the microcomputer 3 determines whether the clutch switch 7f is turned on or off.

If the brake switch 7e or clutch switch 7f is turned off (open), the corresponding F/F circuit 23e or 23f is reset in the same way as described in the case of the cancel switch 7d and the cruise speed control is released. (steps 140 to 190).

Next, if the release switch 7 is inoperated and the set/cruise switch 1a is operated, the F/F circuit 23a is first set and thereafter reset in response to the command signal from the set/cruise switch 1a and in response to the receipt signal from the microcomputer 3. Then, a set flag SF is set to "1" and control valves of the throttle actuator 5 are all denergized and the vehicle enters in the cruise run state in steps 200 to 220.

When the acceleration switch 1b is operated, the command signal outputted from the acceleration switch 1b and the receipt signal cause the F/F circuit 23b to be set and reset, an acceleration flag AF and cruise flag CF are respectively set to "1" and the vehicle speed is increased at a constant rate. (steps 230 and 240).

When the resume switch 1c is operated, the command signal from the resume switch 1c and the corresponding receipt signal from the microcomputer 3 cause the F/F circuit 23c to be set and reset, a resume flag RF is set to "1", and all control valves of the throttle actuator 5 are deenergized (steps 260 to 280).

In steps 290 and 300, if the set flag SF is set to "1" with neither command signal from the command switch group 1 nor release switch 7 supplied to the microcomputer 3, the current vehicle speed v is set as the cruise speed $v_S$ at which the vehicle is desired to cruise, the control valves of the actuator 5 are once all deenergized, and thereafter the cruise flag CF is set to "1". The set flag SF is set to "0" in the steps 290 and 300.

If the set flag SF is set to "0" and the acceleration flag AF is set to "1", the current vehicle speed v is set as the cruise speed $v_s$, the control valves of the actuator 5 are once deenergized, and the acceleration flag AF is set to "0" (steps 310 and 320).

If the set flag SF and acceleration flag AF are set to "0" and the resume flag RF is set to "1", the cruise flag CF is set to "1". If the current vehicle speed v is larger than the set cruise speed $v_s$, the resume flag RF is set to "0". If the current vehicle speed v is smaller than the set cruise speed $v_s$, the control valves of the throttle actuator 5 are energized to accelerate the vehicle (refer to a table to be depicted later in a third preferred embodiment for the open and closed state of the control valves of the throttle actuator 5) (the opening angle of the throttle valve is increased) so that the current vehicle speed v is returned to the original set cruise speed $v_s$ in steps 330 to 370.

If all of the set flag, acceleration flag, and resume flag are set to "0" and the cruise flag CF is set to "0", all control valves of the actuator 5 are denergized (the throttle valve is directed in a full close position) in steps 380 and 400.

On the other hand, if the cruise flag is set to "1", a value of epsilon (control variable) is derived in the following equation.

$$\text{epsilon} = K_p V + K_I(v - v_s)$$

In the above equation, $K_p$ and $K_I$ denote proportional and integration gains and constants and V denotes a change rate of the vehicle speed with time. If the epsilon is larger than 0, the control valves of the actuator 5 are deenergized to reduce the vehicle speed. If the epsilon is smaller than 0, the actuator control valves 5 are energized to increase the vehicle speed. Therefore, the cruise control operation is carried out to match the vehicle speed with the set cruise speed.

When one command signal from one of the command switches 1 or release switches 7 is issued, this command or release signal is supplied to the microcomputer 3 and to the corresponding F/F circuit 23a to 23f. Thus, the F/F circuit 23a to 23f to which the command signal is received is set. However, if no receipt signal is supplied to the corresponding set F/F circuit 23a to 23f, the output signal of the F/F circuit 23a to 23f is held in the high-level state.

The output signal state of the OR gate 25 is high and the output signal of the OR gate 25 is inverted by means of the inverter 29 and one input terminal of the AND gate 19 is in the low-level state. Hence, since the reset signal of the AND gate 19 becomes low, the microcomputer 3 is reset.

Furthermore, since the output signal of the inverter 29 becomes low, the main switch 1 and throttle actuator relay 15 are open. Then, the power supply of the main power supply 9 to the microcomputer 3 is halted and the supply of the control command signals to the throttle actuator 5 from the microcomputer 3 is also halted. The vehicle is set in normal control condition, i.e., through the accelerator pedal.

It is noted that although, in the first preferred embodiment, the number of the F/f circuits 23a to 23f constituting the monitoring circuit 21 is six to correspond to the total number of the command switches 1 and release switches 7, a logic product of the command signals derived from the respective command switches 1 may be taken to set a single F/f circuit, a logic OR of the receipt signals corresponding to each command signal may be taken to reset the single F/F circuit, and the same single F/F circuit may be provided for the release switches in the same way as in the case of the command signals. If this is done, the number of the F/F circuits may be reduced.

Second preferred embodiment

Figure 3:
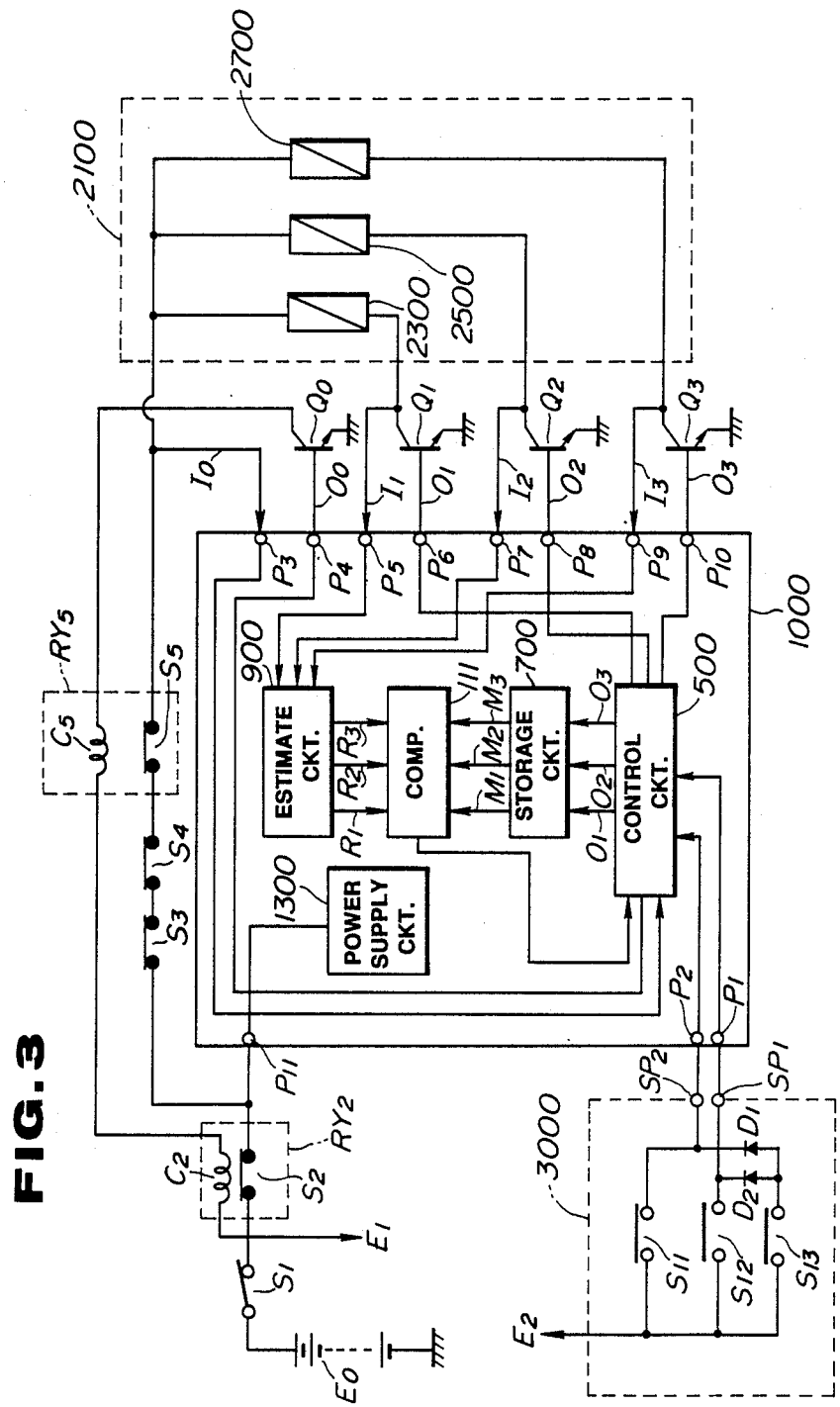
FIG. 3 is a schematic circuit block diagram of another system for automatically controlling a vehicle speed to a desired cruise speed according to the present invention in a second preferred embodiment.

FIG. 3 shows a second preferred embodiment of the automatic cruise speed controlling system according to the present invention.

As shown in FIG. 3, the battery $E_0$ is connected to one end of a contact $S_2$ of a relay $RY_2$ via an ignition switch $S_1$. The other end of the contact $S_2$ of a normally closed type is connected to one end of the clutch switch $S_3$ and to an input terminal $P_{11}$ of the control unit 1000. The contact $S_2$ and the coil $C_2$ constitute a relay $RY_2$.

One end of thhe coil $C_2$ is connected to a DC power supply $E_1$. The other end of the coil $C_2$ is connected to one end of a coil $C_5$ of the relay $RY_5$. The other end of the coil $C_5$ is connected to a collector of a transistor $Q_o$. A base of the transistor $Q_o$ is connected to an input terminal $P_4$ of the control unit 1000.

The other end of the clutch switch $S_3$ is connected to one end of the brake switch $S_4$. The other end of the brake switch $S_4$ is connected to one end of a contact $S_5$ of a relay $RY_5$. The other end of the contact $S_5$ of a normally closed type is connected to an input terminal $P_3$ of the control unit 1000. It is noted that FIG. 3 shows a state in which the cruise speed control is executed in the automatic cruise speed controlling system with the ignition switch $S_1$ turned on. During the cruise speed controlled run, when the transistor $Q_o$ is turned on in response to the control command signal from the control unit 1000, the relay $RY_2$ is operated to open the contact $S_2$ so that the power supply to the control unit 1000 and to the actuator 2100 to be described later is interrupted. In addition, if the transistor $Q_o$ is turned on, the relay $RY_5$ is interlocked with the relay $RY_2$ so that the contact $S_2$ is open and the contact $S_5$ is simultaneously open. Thus, the power supply of the battery $E_o$ to the actuator 2100 is doubly interrupted.

It is noted that the command switch group 3000 ($S_{11}$, $S_{12}$, and $S_{13}$) is installed on a steering portion of the vehicle and connected to the control unit 1000 via slip rings $SP_1$ and $SP_2$. One end of each command switch $S_{11}$, $S_{12}$, and $S_{13}$ is connected to a predetermined DC power supply $E_2$. The other end of the set/cruise switch $S_{11}$ is connected to an input terminal $P_2$ of the control unit 1000, the other end of the acceleration/resume switch $S_{12}$ is connected to an input terminal $P_1$ of the control unit 1000, and the other end of the cancel switch $S_{13}$ is connected to the input terminal $P_2$ via the slip ring $SP_2$ and a diode $D_1$ and the input terminal $P_1$ via the slip ring $SP_1$ and diode $D_2$.

The functions of the set/cruise switch $S_{11}$, acceleration/resume switch $S_{12}$, and cancel switch $S_{13}$ are exemplified in the first preferred embodiment and by two United Patent Applications having priorities based on a Japanese Patent Application sho 62-273935 filed on Oct. 29, 1987 and based on two Japanese Utility Model Applications No. sho 62-165384 and No. sho 62-165385 both filed on Oct. 30, 1987, the contents of both United States Patent Applications being hereby incorporated by reference.

Next, a collector of the transistor $Q_1$ is connected to an input terminal $P_5$ of the control unit 1000. The input terminal $P_5$ provides a transmission signal $I_1$ from the transistor $Q_1$. A base of the transistor $Q_1$ is connected to a control circuit 500 via an output terminal $P_6$ of the control unit 1000 and receives the control signal $O_1$ from the control circuit 500. A collector of a transistor $Q_2$ is connected to an input terminal $P_7$ of the control unit 1000 and the transistor $Q_2$ transmits a transmission signal $I_2$ to the input terminal $P_7$. A base of the transistor $Q_2$ is connected to an output terminal $P_8$ of the control unit 1000. The control command signal $O_2$ is supplied to the base of the transistor $Q_2$ via the terminal $P_8$. A collector of a transistor $Q_3$ is connected to an input terminal $P_9$ of the control unit 1000 and the input terminal $P_9$ receives a transmission signal $I_3$ derived from the transistor $Q_3$. A base of the transistor $Q_3$ is connected to the control circuit 500 via an output terminal $P_{10}$ to receive the control command signal $O_3$ from the control circuit 500.

The control circuit 500 includes a register for registering information on the cruise control run and microcomputer for executing various processings on the cruise run and outputs various control signals on the basis of each information derived via the input terminals $P_1$, $P_2$ and $P_3$ and information derived form a comparator 111.

When the control circuit 500 determines that the set/cruise switch $S_{11}$ is operated on the basis of the information inputted through the terminal $P_2$, a cruise control enable signal indicating that the vehicle is transferred into the cruise run state is issued. When the control circuit 500 determines that the shift operation or brake operation has been carried out, the control circuit 500 stores the current vehicle speed as the set cruise speed in storage means thereof and outputs a control release signal indicating that the cruise speed run state is temporarily released. When the control circuit 500 determines that the acceleration/resume switch $S_{12}$ has been operated on the basis of the information derived via the input terminal $P_1$, the control circuit 500 issues the control command signal indicating that the vehicle speed is returned to the originally stored cruise speed. When the control circuit 500 determines that the cancel switch $S_{13}$ has been operated on the basis of the information inputted simulataneously via the input terminals $P_1$ and $P_2$.

In addition, the control circuit 500 is connected to a storage circuit 700 and to the terminals $P_6$, $P_8$, and $P_{10}$. That is to say, the control circuit 500 outputs the control command signal $O_1$ to the terminal $P_6$, outputs the control command signal $O_2$ to the terminal $P_8$, and outputs the control command signal $O_3$ to the terminal $P_{10}$. The respective control signals $O_1$ to $O_3$ are supplied to the storage circuit 700. It is noted that the control circuit 500 sequentially outputs the control command signals $O_1$ to $O_3$ for each predetermined period of time, e.g., 300 milliseconds. When the storage circuit 700 stores the control command signals $O_1$ to $O_3$ as storage information $M_1$ to $M_3$. An estimation circuit 900 is connected to terminals $P_5$, $P_7$, and $P_9$. The estimation circuit 900 receives the transmission signal $I_1$ from the transistor $Q_1$ via the terminal $P_5$, receives the transmission signal $I_2$ from the transistor $Q_2$ via the terminals $P_7$, and receives the transmission signal $I_3$ from the transistor $Q_3$ via the terminal $P_9$. The estimation circuit 900 estimates the corresponding control command signal on the basis of each transmission signal $I_1$ to $I_3$ of the transistors $Q_1$ to $Q_3$. That is to say, since the transmission signals $I_1$ to $I_3$ are operated on the basis of the control command signals derived from the control circuit 500 for each predetermined control period (,e.g., 10 milliseconds) so that the transmission signals $I_1$ to $I_3$ are transmitted, the estimation circuit 900 estimates a signal value of each control command signal supplied to the corresponding bases of the transistors $Q_1$ to $Q_3$ on a basis of a signal value of each transmission signal $I_1$ to $I_3$ whenever the predetermined control period has passed.

Suppose that the value of the control command signal is estimated on the basis of the value of the transmission signal $I_1$ of the transistor $Q_1$.

For example, a low-level state of the transmission signal $I_1$ teaches that the transistor $Q_1$ is conducted. To set the transistor $Q_1$ in the conductive state, a signal having a high level which is inverted from the signal level of the transmission signal I is estimated to be provided. Hence, the estimation circuit 900 estimates that a signal $\bar{I}_1$ which is an inverted level of the transmission signal $I_1$ is set as an estimated value $R_1$ and a signal correlative to the estimated value $R_1$ has been supplied to the base of the transistor $Q_1$.

Similarly, the following estimated values $R_2$ and $R_3$ are set for the transmission signals $I_1$ and $I_3$ of the transistors $Q_2$ and $Q_3$.

$$R_1 = \bar{I}_1$$
$$R_2 = \bar{I}_2$$
$$R_3 = \bar{I}_3$$

the estimation circuit 900 is supplied to the comparator 111.

The comparator 111 inputs the storage information $M_1$, $M_2$, and $M_3$ from the storage circuit 700 and compares the storage information $M_1$, $M_2$, and $M_3$ corresponding to the control command signal output actually from the control circuit 500 with the estimated value $R_1$, $R_2$, and $R_3$ corresponding to each storage information $M_1$, $M_2$, and $M_3$. The information on the comparison result by the comparator 111 is supplied to the control circuit 500. When the control circuit 500 recognizes that each storage information $M_1$, $M_2$, and $M_3$ does not coincide with the corresponding estimated value $R_1$, $R_2$, and $R_3$, the control circuit 500 outputs the high-level signal to the output terminal $P_4$ to turn on the transistor $Q_o$. Thus, the contacts $S_2$ and $S_5$ are simultaneously open so that the power supply to the control unit 1000 and actuator 2100 is interrupted. When a power supply circuit 1300 receives a DC voltage $E_o$ of the power supply via the terminal $P_{11}$, a predetermined DC voltage is supplied to each circuit portion described above.

The function of the actuator 2100 is the same as described in the first and second preferred embodiments.

Figure 4:
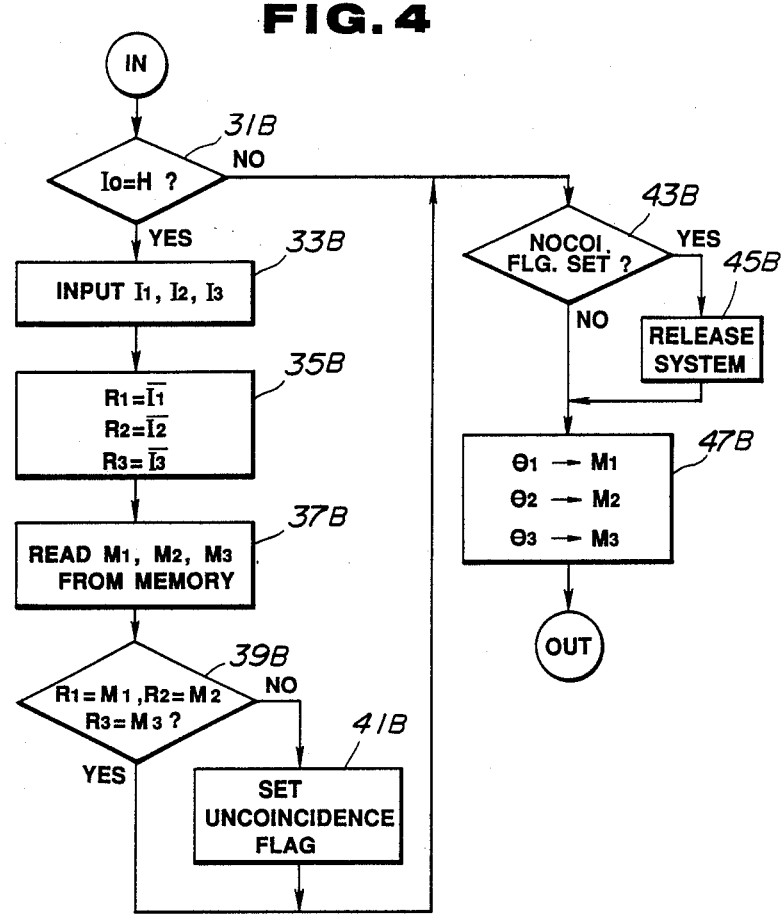
FIG. 4 is an operational flowchart for explaining an operation of the automatic cruise speed controlling system shown in FIG. 3.

FIG. 4 shows an operational flowchart for explaining the operation of the control circuit 500 in the second preferred embodiment shown in FIG. 3.

In a step 31B, the control circuit 500 determines whether the signal level of the signal $I_o$ on the terminal $P_3$ is at the high level (H), i.e., whether the actuator 2100 is enabled to be operated (operable or energizable). If the power is supplied to the actuator 2100, the routine goes to a step 33B. In the step 33B, the estimation circuit 900 inputs each present collector potential of the corresponding transistors $Q_1$, $Q_2$, and $Q_3$, i.e., the transmission signals $I_1$, $I_2$, and $I_3$. In a step 35B, a value to which each signal level of the transmission signals $I_1$, $I_2$, and $I_3$ is inverted is set as each estimated value $R_1$, $R_2$, and $R_3$. That is to say, the estimation circuit 900 estimates that the signals correlative to the estimated values $R_1$, $R_2$, and $R_3$ are supplied to the respective bases of the transistors $Q_1$, $Q_2$, and $Q_3$. In a step 37B, the storage information (data) $M_1$, $M_2$, and $M_3$ corresponding to the control signals $O_1$, $O_2$, and $O_3$ at the time when the transmission signals $I_1$, $I_2$, and $I_3$ are transmitted are read from the storage circuit 700. In a step 39B, the control circuit 500 determines that the estimated values $R_1$, $R_2$, and $R_3$ are equal to the storage information $M_1$, $M_2$, and $M_3$, i.e., $R_1 = M_1$, $R_2 = M_2$, and $R_3 = M_3$. If both corresponding signals of the estimated values and storage information coincide with each other, i.e., there are coincidences, the routine goes to a step 47B via a step 43B.

In a step 39B, if any one of one or more couples correlatively corresponding signals between the estimated values and storage information does not coincide with each other, the control circuit 500 determines that the coincidence cannot be obtained between the control signals and the transmission signals and the routine goes to a step 41B. In a step 41B, a nocoicidence flag indicating that there is no coincidence between the estimated value $R_1$, $R_2$, and $R_3$ and storage information $M_1$, $M_2$, and $M_3$ is set. In a step 43B, the control circuit 500 determines whether the nocoincidence flag is set. If the nocoincidence flag is set, the routine goes to a step 45B to release the cruise run state. That is to say, with the transistor $Q_o$ turned to ON, the relays $RY_2$ and $RY_5$ are operated to open the contacts $S_2$ and $S_5$. Therefore, the power supply to the control unit 1000 and to the actuator 2100 is interrupted. In this way, after the step 43B in which the cruise run state is released and the normal control run is possible, the routine goes to the step 47B in a case where the nocoincidence flag is not set. In the step 47B, an operating variable of the throttle valve is determined on the basis of each kind of information on the cruise run. In the next control period, new control signal $O_1$, $O_2$, and $O_3$ corresponding to the operating variable is stored as the storage information $M_1$, $M_2$, and $M_3$ into the storage circuit 700. The control signals $O_1$, $O_2$, and $O_3$ at the next predetermined control period are outputted to the terminals $P_6$, $P_8$, and $P_{10}$.

In a step 45B, the power supply to the control unit 1000 and to the actuator 2100 is interrupted. If warning light is provided and the warning light is illuminated to indicate that the cruise running state is released, the driver can recognize that the cruise run state is forcibly released and countermeasures for quick and more stable running operation can be carried out.

In the second preferred embodiment shown in FIGS. 3 and 4, when the ignition switch $S_1$ is turned on, the power supply to the control unit 1000 and actuator 2100 are simultaneously carried out, first switch for supplying the power only to the control unit 1000 after the ignition switch $S_1$ is closed and second switch for supplying power only to the actuator 2100 after the first switching means is operated may alternatively be provided. In this way, more stable running operation can be carried out.

Third preferred embodiment

Figure 5:
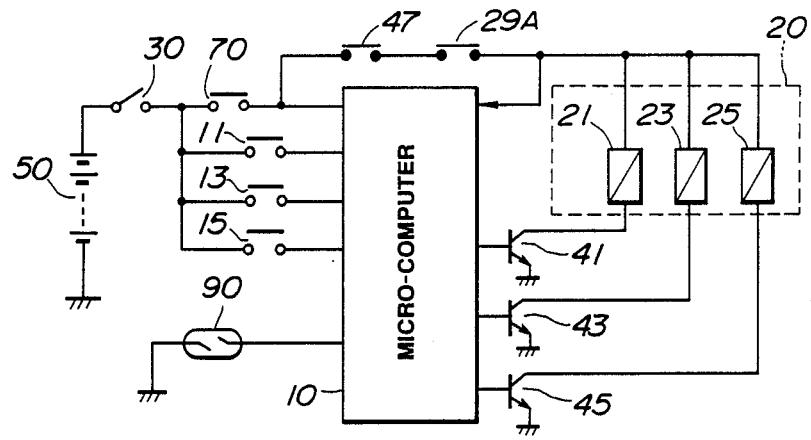
FIG. 5 is a schematic block diagram of still another automatic cruise speed controlling system according to the present invention in a third preferred embodiment.

FIG. 5 shows a third preferred embodiment of the automatic cruise speed controlling system according to the present invention.

In FIG. 5, a battery 50 corresponds to the main power supply 9 shown in FIG. 1, numeral 30 denotes an ignition switch, a cruise speed control main switch 70 is connected to the ignition switch 30 and to the microcomputer 10, numerals 11, 13, and 15 denote the set/cruise switch, acceleration switch, and resume switch corresponding to those 1a, 1b, and 1c shown in FIG. 1, numerals 21, 23, and 25 denote the safety (release) valve, supply valve, and air valve of the throttle actuator 5 shown in FIG. 1, numeral 90 denotes the vehicle speed sensor corresponding to that 13 shown in FIG. 1, numeral 47 denotes the brake switch corresponding to that denoted by 7e in FIG. 1, and numeral 29 denotes the clutch switch denoted by 7f shown in FIG. 1. The microcomputer 10 corresponding to that denoted by 3 shown in FIG. 1 outputs control command signals to respective bases of transistors 41, 43, and 45 connected to the corresponding valves 21, 23, and 25 in the following table.

| VALVE CRUISE CONT | RELEASE VALVE 21 | AIR SUPPLY VALVE 23 | AIR VALVE 25 |
| --- | --- | --- | --- |
| NON CRUISE CONTROL | OPEN | CLOSE | OPEN |
| CRUISE CONTROL | | | |
| $V_s < V$ | CLOSE | CLOSE | OPEN |
| $V_s = V$ | CLOSE | CLOSE | CLOSE |
| $V_s > V$ | CLOSE | OPEN | CLOSE |

As appreciated from the above table, when no cruise control operation is carried out, the air valve 25 and release valve 21 are open and the supply valve 23 is closed so that the actuator 20 is not operated. In this case, the opening angle of the throttle valve is decreased unless the accelerator pedal is depressed. During the cruise control, the release valve 21 is closed and air valve and air supply valve 25 and 23 are open and closed so that the opening angle of an engine throttle valve is adjuted to render the vehicle speed V match with the cruise speed $V_s$.

Figure 6A:
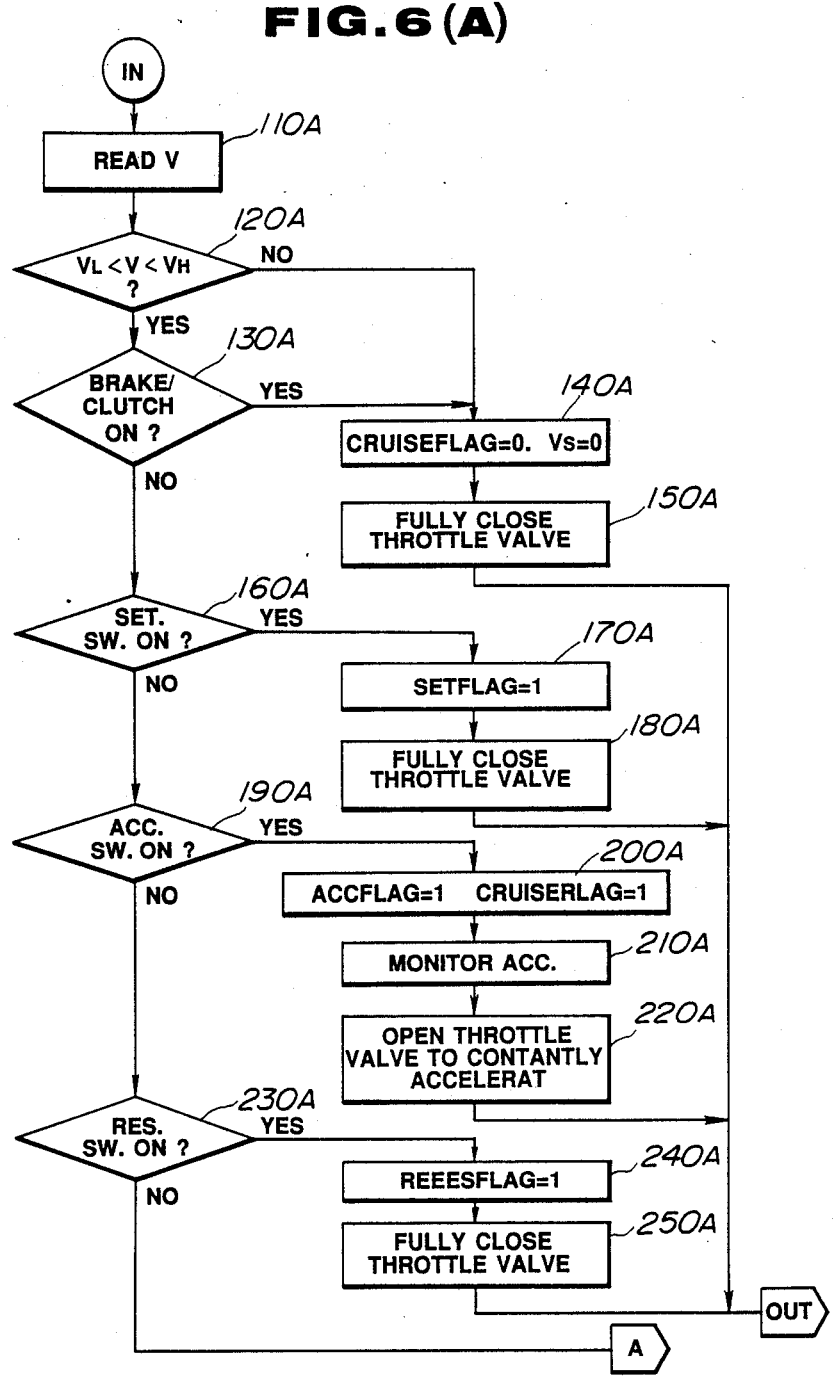
FIGS. 6(A) and 6(B) are integrally a flowchart for explaining a monitoring operation on an acceleration control to be executed by the automatic cruise speed controlling system shown in FIG. 5.
Figure 6:
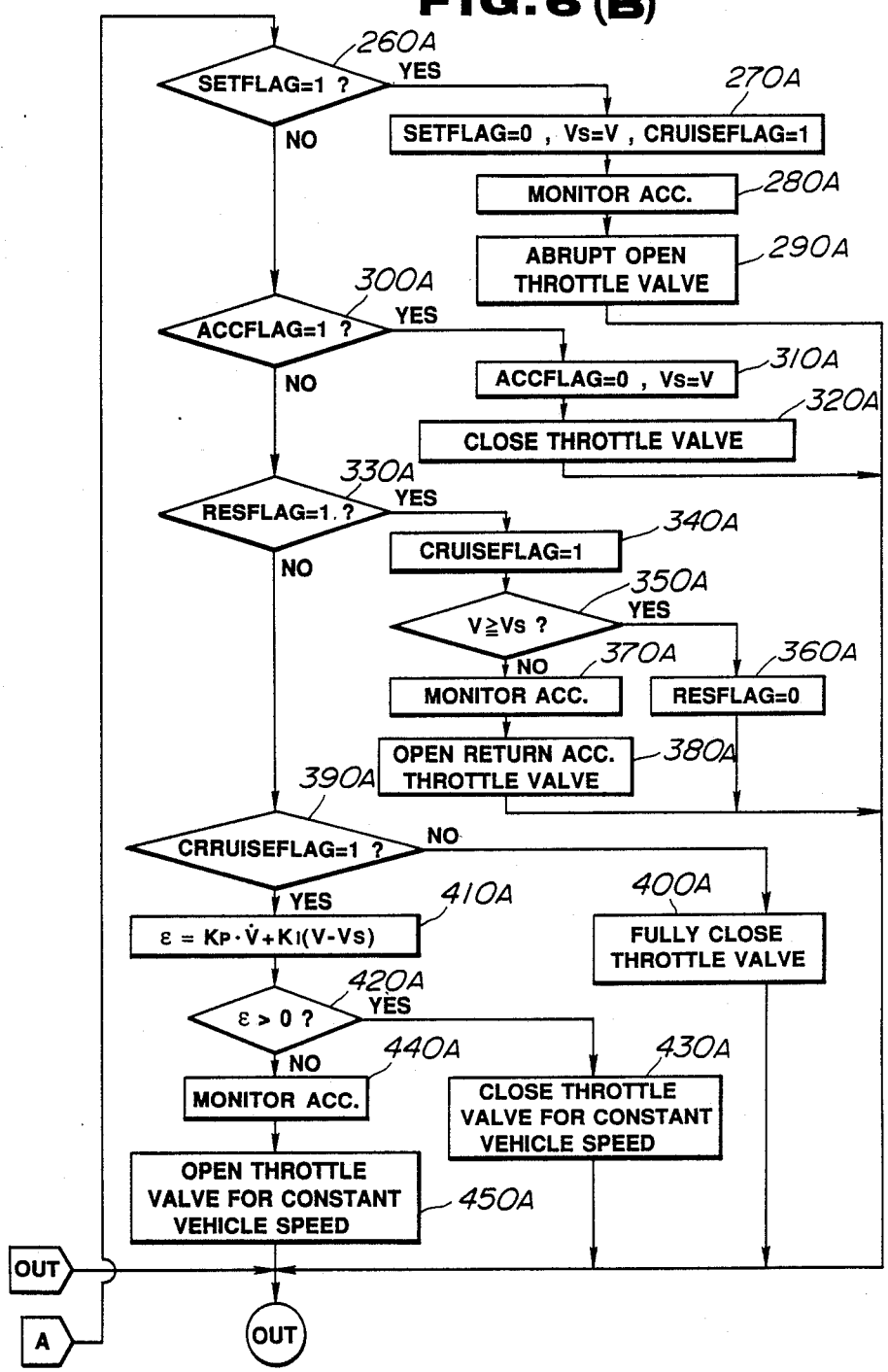

FIGS. 6(A) and 6(B) show integrally a flowchart executed by the microcomputer 10 shown in FIG. 5.

Figure 7:
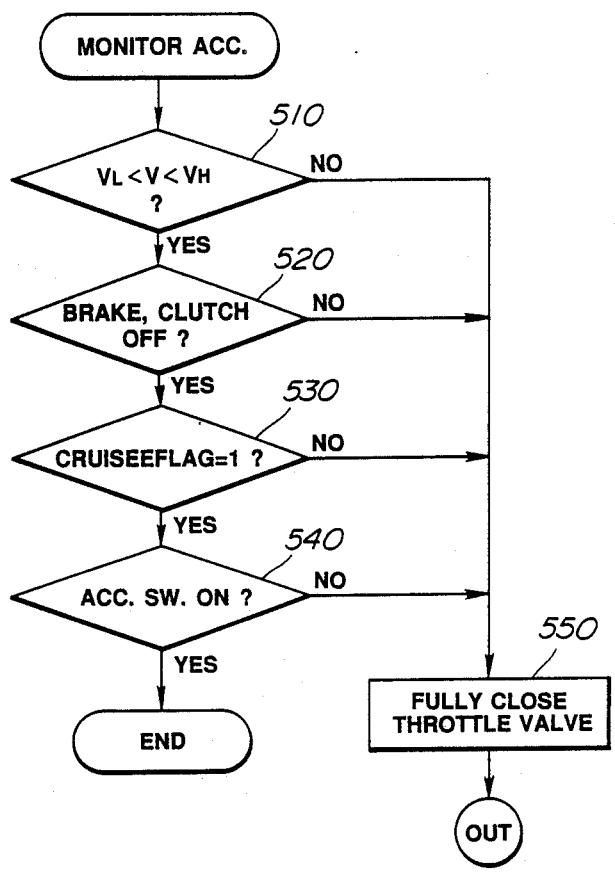
FIG. 7 is another flowchart for explaining an operation of the automatic cruise speed controlling system shown in FIG. 5.

FIG. 7 shows another flowchart of an acceleration monitoring executed as a subroutine in the microcomputer 10.

Figure 2A:
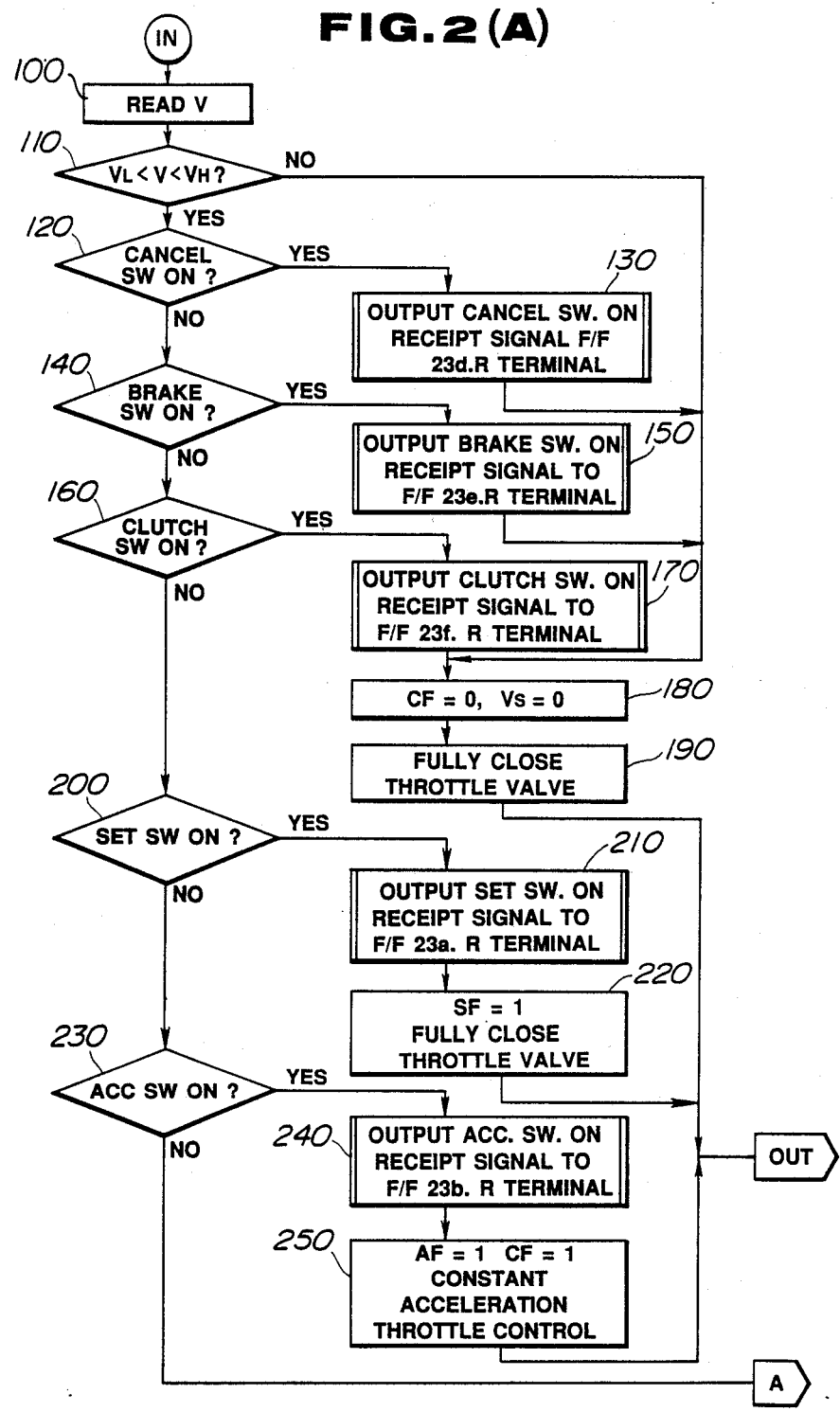
FIGS. 2(A) and 2(B) are integrally a flowchart for explaining an operation of the system for automatically controlling the vehicle speed to the desired cruise speed.
Figure 2B:
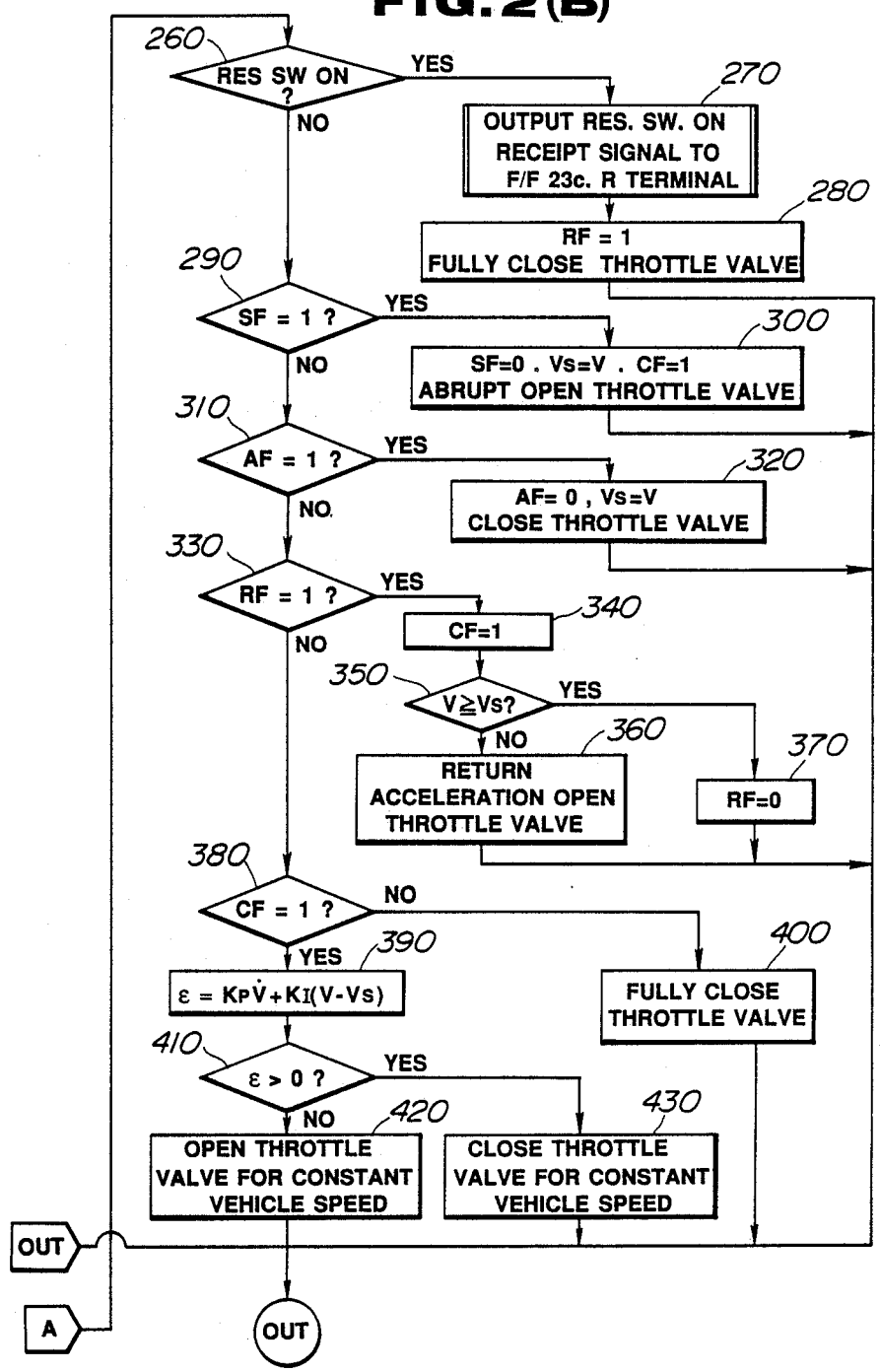

In FIGS. 6(A) and 6(B), CRUISEFLAG corresponds to CF in FIGS. 2(A) and 2(B), SETFLAG corresponds to SF in FIGS. 2(A) and 2(B), ACCFLAG corresponds to AF in FIGS. 2(A) and 2(B), RESFLAG corresponds to RF in FIGS. 2(A) and 2(B), and the steps 120, 130, 150, 170, 210, 240, and 270 shown in FIGS. 2(A) and 2(B) are omitted, and steps 210A, 280A, 370A, and 440A are added as shown in FIGS. 6(A) and 6(B).

In details, in the steps 210A, 280A, 370A, and 440A, the microcomputer 10 jumps a subroutine, i.e., acceleration monitoring routine shown in FIG. 7.

For example, in a step 510, the microcomputer 10 determines whether the current vehicle speed V measured from the vehicle speed information derived from the vehicle speed sensor 90 falls in the cruise speed allowable range ($V_L < V < V_H$). If $V_L < V < V_H$ (yes) in the step 510, the microcomputer 10 determines whether either the brake switch 47 or clutch switch 29A is closed in a step 520. If the brake switch 47 and the clutch switch 29A are closed (Yes) in the step 520, the subroutine goes to a step 530 in which the microcomputer 10 determines whether CRUISEFLAG is set to "1". If CRUISEFLAG=1 in the step 530, the subroutine goes to a step 540 in which the microcomputer 10 determines whether ACC.SW (acceleration switch 13) is turned on. If ACC.SW is turned on (Yes) in the step 540, the subroutine is ended and the routine returns to the step 220A subsequent to the step 210A. That is to say, in the case of yes in each step 510 to 540, the acceleration monitoring is ended. In the step 220A, the control command signal to open the throttle valve to accelerate the vehicle at the constant increase rate is issued from the microcomputer 10 to the actuator 20 via the transistors 41 to 45. If $V_L \geq V$, or $V \geq V_H$ in the step 510, either the brake switch 47 or clutch switch 29A is open, CRUISEFLAG=0, ACC.SW is turned to OFF, in the steps 510, 520, 530, and 540, the subroutine goes to a step 550 in which the microcomputer 10 issues the control command signal to fully close the throttle valve to decrease the vehicle speed V and the whole routine is ended. The same subroutine is executed in the same way as the remaining steps 280A, 370A, and 440A. The contents of the subroutine executed in the corresponding steps are the same as shown in FIG. 7.

The other contents of the steps are carried out in the same way as described with reference to FIGS. 2(A) and 2(B).

It is noted that the microcomputer 10 shown in FIG. 5 may execute the program routine shown in FIG. 4 of the second preferred embodiment. In this case, the output ports of the microcomputer 10 need to be connected to each collector of the three transistors 41, 43, and 45 although not specifically shown in FIG. 5.

Described above is a system and method for automatically controlling the vehicle speed to the desired cruise speed. In this present invention, the condition to interrupt the power supply to the control unit and throttle actuator is mainly placed on the output levels of the control command signals. This creates a more reliable system and method for automatically controlling the vehicle speed to the desired cruise speed. In addition, when one control command signal to accelerate the vehicle is issued from the control unit, the subroutine which monitors acceleration is provided to safely accelerate the vehicle.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for a vehicle, comprising:
  (a) first means for detecting a current vehicle speed;
  (b) second means for outputting command signals from a plurality of command switches;
  (c) third means for outputting release signals from a plurality of release switches;
  (d) fourth means for receiving and responding to said command signals from the second means, by outputting corresponding control command signals through each of a plurality of first output ports and outputting to a plurality of second output ports a plurality of receipt signals whose number corresponds to the number of said command and said release signals received, each receipt signal indicating that the corresponding command or release signal is correctly received by the fourth means;
  (e) fifth means for controlling the vehicle speed in accordance with said control command signals received from the fourth means by controlling a plurality of engine control valves;
  (f) sixth means for determining whether the fourth means outputs one of and receipt signals for each of said command and release signals output from the second and third means;
  (g) seventh means for determining whether the control command signals output from the fourth means are equal to inverted signal levels at the respective control valves of the fifth means; and
  (h) eighth means for interrupting the power supply to the fourth means and fifth means when the determination of either the sixth and seventh means satisfies a predetermined condition.

2. A system as set forth in claim 1, wherein the eighth means interrupts the power supply to the fourth and fifth means when the determination of either the sixth or seventh means indicates a negative result.

3. A system as set forth in claim 2, wherein the sixth means includes a plurality of flip-flop circuits, each flip-flop circuit having a set terminal connected to a corresponding switch of said command and said release switches and a reset terminal connected to the output of the fourth means, an OR gate having inputs connected to the outputs of the flip-flop circuits, a time constant circuit connected to an output of the OR gate, and an inverter connected to the time constant circuit.

4. A system as set forth in claim 3, which further comprises an AND gate for supplying a reset signal to the fourth means upon receipt of the low-level signal of said inverter so that the fourth means is reset.

5. A system as set forth in claim 4, which further comprises a watchdog timer for detecting an abnormal operation of the fourth means and outputting a low-level signal to the AND gate when detecting the abnormal operation of the fourth means.

6. A system as set forth in claim 5, wherein the fourth means includes a microcomputer.

7. A system as set forth in claim 6, which further comprises a first power supply switch connected between the microcomputer and the fifth means for interrupting the output of the control command signals from the microcomputer to the control valves upon receipt of the low-level signal from the inverter and a second power supply switch for interrupting the power supply to the microcomputer from the power supply upon receipt of the low-level signal from the inverter.

8. A system as set forth in claim 5, wherein a time constant of said time constant circuit is set to have a duration to bring the output signal of the OR gate into the high-level state long enough for the fourth means to output a response after the second and third means have output their respective signals.

9. A system as set forth in claim 1, which further comprises:
(a) a plurality of first transistors connected respectively between the first output ports and said control valves;
(b) nineth means which includes a plurality of third output ports for outputting the control command signals;
(c) tenth means which includes an estimation circuit connected to said first transistors for receiving and inverting transmission signals from said first transistors, and outputting said inverted-level signals;
(d) a storage circuit for storing said control command signals output from said third output ports;
(e) a comparator for comparing said inverted level signals with said stored control command signals and outputting a comparison signal indicative of the result of the comparison; and
(f) a control circuit for outputting a low level signal when said comparison signal indicates that said inverted signals and said stored control command signals do not coincide.

10. A system as set forth in claim 9, wherein the eighth means includes a second transistor which turns off upon receipt of said low level signal from said control circuit, a first power supply relay connected between the power supply and a power supply circuit of the forth means, and a second power supply relay connected between the first power supply relay and the second transistor, said first and second power supply relay being open when the second transistor turns off so that the power supply circuit of the fourth means is turned off and the power supply to the fifth means is interrupted.

11. A system as set forth in claim 1, wherein: (a) the second means includes a first command switch through which the current vehicle speed is set as a cruise speed at which the vehicle is desired to cruise and which outputs a first command signal, a second command switch through which the current cruise speed set through the first switch is increased at a constant change rate of the vehicle speed to another cruise speed at which the vehicle is desired to cruise and which outputs a second command signal, and a third command switch through which the current vehicle speed is again returned to the original cruise speed before a system operation is released and which outputs a third command signal; and (b) the third means includes a first release switch through which a first release signal is outputted when a brake system is operated, a second release switch through which a second release signal is outputted when a clutch system is operated, and a third release switch through which a third release signal is outputted when a cancel switch is operated.

12. A system as set forth in claim 11, wherein the fourth means:
(a) receives fist, second, and third command signals output from the corresponding first, second and third command switches, the contents of said command signals indicating that the fifth means should change control valve settings to alter the engine driving force;
(b) includes a ninth means to determines whether the current vehicle speed falls in the cruise speed control allowable range;
(c) determines whether the first, second, or third release switch is operated, and determines whether the third command switch is operated; and
(d) outputs the control command signals to the fifth means so that an operating variable of an engine driving force adjusting mechanism becomes zero when the ninth means and fourth means indicate all negative results of the determinations.

13. A system as set forth in claim 12, wherein the contents of the output control command signals when the ninth means and fourth means indicate all negative results of determinations are all low levels.

14. A system as set forth in claim 13, wherein the fifth means includes:
(a) a release valve which is normally open and which is closed to close a chamber defined by a diaphragm linked to an engine throttle valve in response to the corresponding control command signal having the high level generated by the fourth means;
(b) an air pressure supply valve which is normally closed and which is open to introduce compressed air into the chamber so that the opening angle of the throttle valve is increased in response to the corresponding control command signal having the high level generated by the fourth means; and
(c) an air valve which is normally open and which is closed to interrupt the supply of the atmospheric pressure into the chamber in response to the corresponding control command signal having the high level.

15. A system for a vehicle, comprising:
(a) first means for detecting a current vehicle speed;
(b) second means for outputting command signals from a plurality of command switches;

(c) third means for outputting release signals from a plurality of release switches;
(d) fourth means for receiving and responding to said command signals from the second means, by outputting corresponding control command signals through each of a plurality of first output ports and outputting to a plurality of second output ports a plurality of receipt signals whose number corresponds to the number of said command and release signals received, each receipt signal indicating that the corresponding command or release signal is correctly received by the fourth means;
(e) fifth means for controlling the vehicle speed in accordance with said control command signals received from the fourth means by controlling a plurality of engine control valves;
(f) sixth means for detecting a first condition if said command and said release signals output from the second and third means have a corresponding receipt signal from the fourth means and a second condition if said control command signals output from the fourth means are unequal to a corresponding control valve signal of the fifth means; and
(g) seventh means for interrupting the power supply to the fourth and fifth means when at least one of the conditions is detected by the sixth means.

16. A system for a vehicle, comprising:
(a) first means for detecting a current vehicle speed;
(b) second means for outputting command signals from a plurality of command switches;
(c) third means for outputting release signals from a plurality of release switches;
(d) fourth means for receiving and responding to said command signals from the second means, by outputting corresponding control command signals through each of a plurality of first output ports and outputting to a plurality of second output ports a plurality of receipt signals whose number corresponds to the number of said command and release signals received, each receipt signal indicating that the corresponding command or release signal is correctly received by the fourth means;
(e) fifth means for controlling the vehicle speed in accordance with said control command signals received from the fourth means by controlling a plurality of engine control valves;
(f) sixth means for determining whether the fourth means outputs said receipt signals for each of said command and release signals output from the second and third means;
(g) seventh means for determining whether the said control command signals output from the fourth means are equal to the inverted levels at the respective control valves of the fifth means; and
(h) eighth means for continuing the power supply to the fourth means and fifth means when the determination of either the sixth and seventh means satisfies a predetermined condition.

17. A method for automatically controlling a vehicle speed to a desired cruise speed, comprising the steps of:
(a) detecting a current vehicle speed
(b) providing a plurality of command switches for outputting command signals;
(c) providing a plurality of release switches for outputting release signals;
(d) providing a controlling unit, receptive and responsive to said command signals for outputting corresponding control command signal through each of a plurality of first output ports and outputting to a plurality of second output ports a plurality of receipt signals whose number corresponds to the number of said command and release signals received, each receipt signal indicating that the corresponding command or release signal is correctly received by the controlling unit;
(e) providing a plurality of control valves for controlling the vehicle speed in accordance with said control command signals;
(f) determining whether the fourth means outputs said receipt signals for each of said command and release signals output;
(g) determining whether the said control command signals output from the fourth means are equal to the inverted levels at the respective control valves; and
(h) interrupting the power supply to the controlling unit when the determination in the step (g) satisfies a predetermined condition.

* * * * *